US009722482B2

(12) United States Patent
de Cremoux et al.

(10) Patent No.: US 9,722,482 B2
(45) Date of Patent: Aug. 1, 2017

(54) DIGITAL PULSE SKIPPING MODULATION FOR BUCK CONVERTER WITH AUTO-TRANSITION TO PULSE FREQUENCY MODULATION (PFM)

(71) Applicant: Dialog Semiconductor GmbH, Kirchheim/Teck-Nabern (DE)

(72) Inventors: Guillaume de Cremoux, Edinburgh (GB); Nicolas Borfigat, Edinburgh (GB)

(*) Notice: Subject to any disclaimer, the term of this patent is extended or adjusted under 35 U.S.C. 154(b) by 43 days.

(21) Appl. No.: 14/468,588

(22) Filed: Aug. 26, 2014

(65) Prior Publication Data
US 2016/0049859 A1    Feb. 18, 2016

(30) Foreign Application Priority Data
Aug. 14, 2014    (EP) .................... 14181099

(51) Int. Cl.
*H02M 3/157*    (2006.01)
*H02M 1/08*    (2006.01)
(Continued)

(52) U.S. Cl.
CPC ............. *H02M 1/08* (2013.01); *H02M 3/156* (2013.01); *H02M 3/157* (2013.01);
(Continued)

(58) Field of Classification Search
CPC ................. H02M 3/157; H02M 3/335; H02M 2003/1566; H02M 2001/0012;
(Continued)

(56) References Cited

U.S. PATENT DOCUMENTS 5,912,552 A    6/1999   Tateishi
7,030,596 B1 *  4/2006   Salerno ................. H02M 3/158
                                                    323/282
(Continued)

FOREIGN PATENT DOCUMENTS

EP    14181099.4-1809    2/2015

OTHER PUBLICATIONS

Chunhong, Zhang, Yang Haigang, and Richard Shi. "A wide load range, multi-mode synchronous buck DC—DC converter with a dynamic mode controller and adaptive slope compensation." Journal of Semiconductors 34, No. 6, 2013.*

(Continued)

*Primary Examiner* — Emily P Pham
*Assistant Examiner* — Jye-June Lee
(74) *Attorney, Agent, or Firm* — Saile Ackerman LLC; Stephen B. Ackerman

(57) ABSTRACT

An apparatus and method for a buck converter and regulation loop with pulse skipping modulation (PSM) and auto-transition to pulse frequency modulation (PFM) comprising of a peak current loop configured to provide a method of generating a constant minimal inductor peak current, a system configured to provide a method of skipping pulses utilizing a pulse skipping modulation (PSM) mode of operation, and, the peak current loop configured to provide a method of auto-transition from the pulse skipping modulation (PSM) to a pulse frequency modulation (PFM) mode of operation.

28 Claims, 10 Drawing Sheets

(51) Int. Cl.
  *H02M 3/158* (2006.01)
  *H02M 3/156* (2006.01)
  *H02M 1/00* (2006.01)

(52) U.S. Cl.
  CPC .. *H02M 3/1588* (2013.01); *H02M 2001/0012* (2013.01); *H02M 2001/0032* (2013.01); *H02M 2001/0048* (2013.01); *Y02B 70/1466* (2013.01); *Y02B 70/16* (2013.01)

(58) Field of Classification Search
  CPC . H02M 2001/0032; H02M 2001/0035; H02M 2001/0041; Y02B 70/1466; Y02B 70/16
  USPC .................. 363/21.16; 323/282; 327/103
  See application file for complete search history.

(56) References Cited

U.S. PATENT DOCUMENTS

| | | | |
|---|---|---|---|
| 7,408,333 | B2 | 8/2008 | Chen et al. |
| 7,592,791 | B2 | 9/2009 | Emira |
| 7,595,596 | B2 | 9/2009 | Liu |
| 7,898,235 | B2 | 3/2011 | Seo |
| 9,219,418 | B2 * | 12/2015 | Balakrishnan .... H02M 3/33507 |
| 2007/0080675 | A1 | 4/2007 | Gray et al. |
| 2007/0085520 | A1 | 4/2007 | Ho |
| 2008/0169796 | A1 * | 7/2008 | Buethker ............ H02M 3/1582 323/282 |
| 2010/0283442 | A1 | 11/2010 | Nakashima |
| 2010/0320986 | A1 | 12/2010 | Collins |
| 2011/0101946 | A1 * | 5/2011 | Nguyen ................ H02M 3/158 323/282 |
| 2013/0294118 | A1 * | 11/2013 | So ..................... H02M 3/33507 363/21.16 |

OTHER PUBLICATIONS

"TPS6240x 2.25-MHz 400-mA and 600-mA Dual Step-Down Converter in Small 3-mm×3-mm VSON Package," Texas Instruments, Datasheet, Jun. 2006.*

* cited by examiner

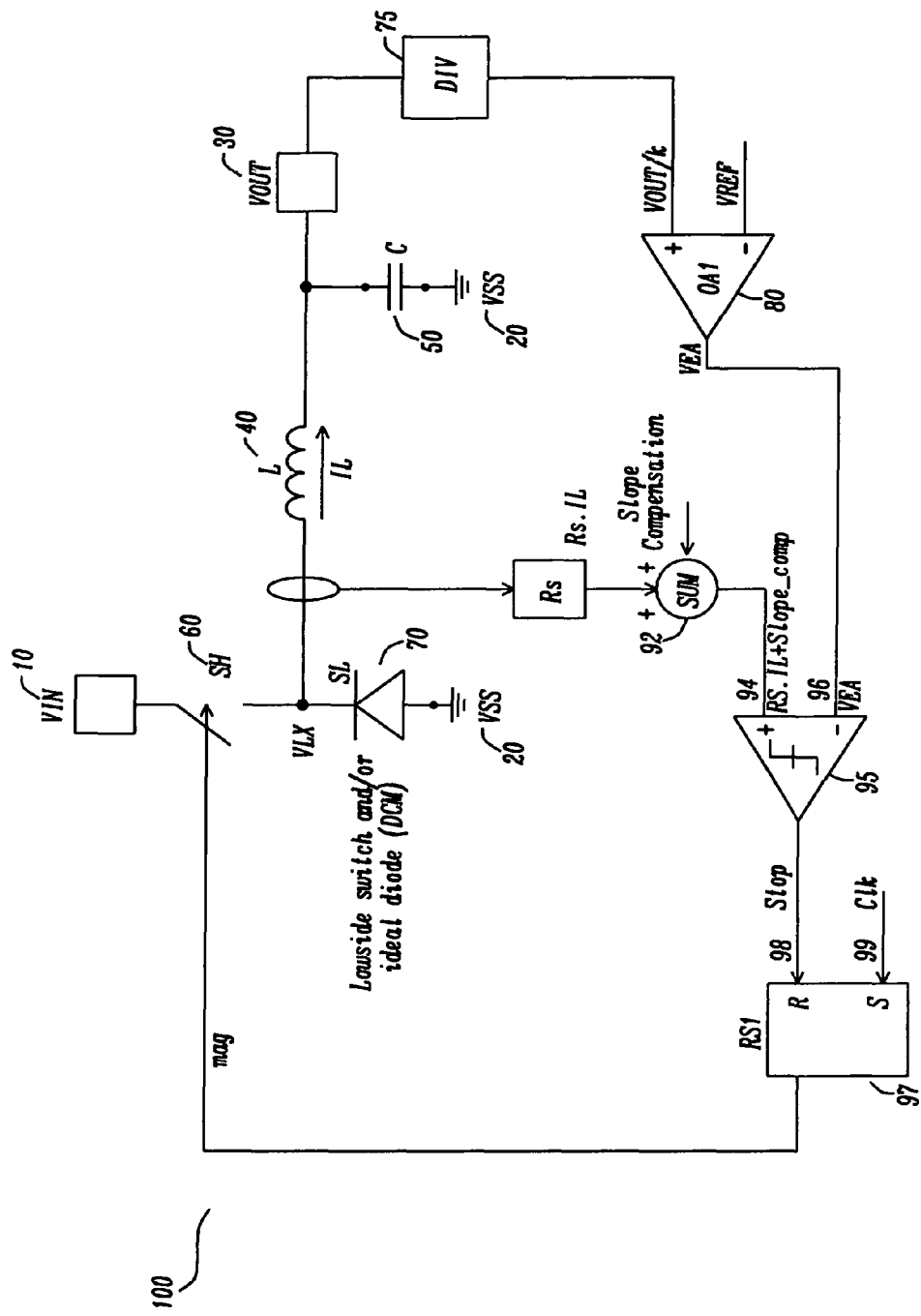
FIG. 1 – Prior Art

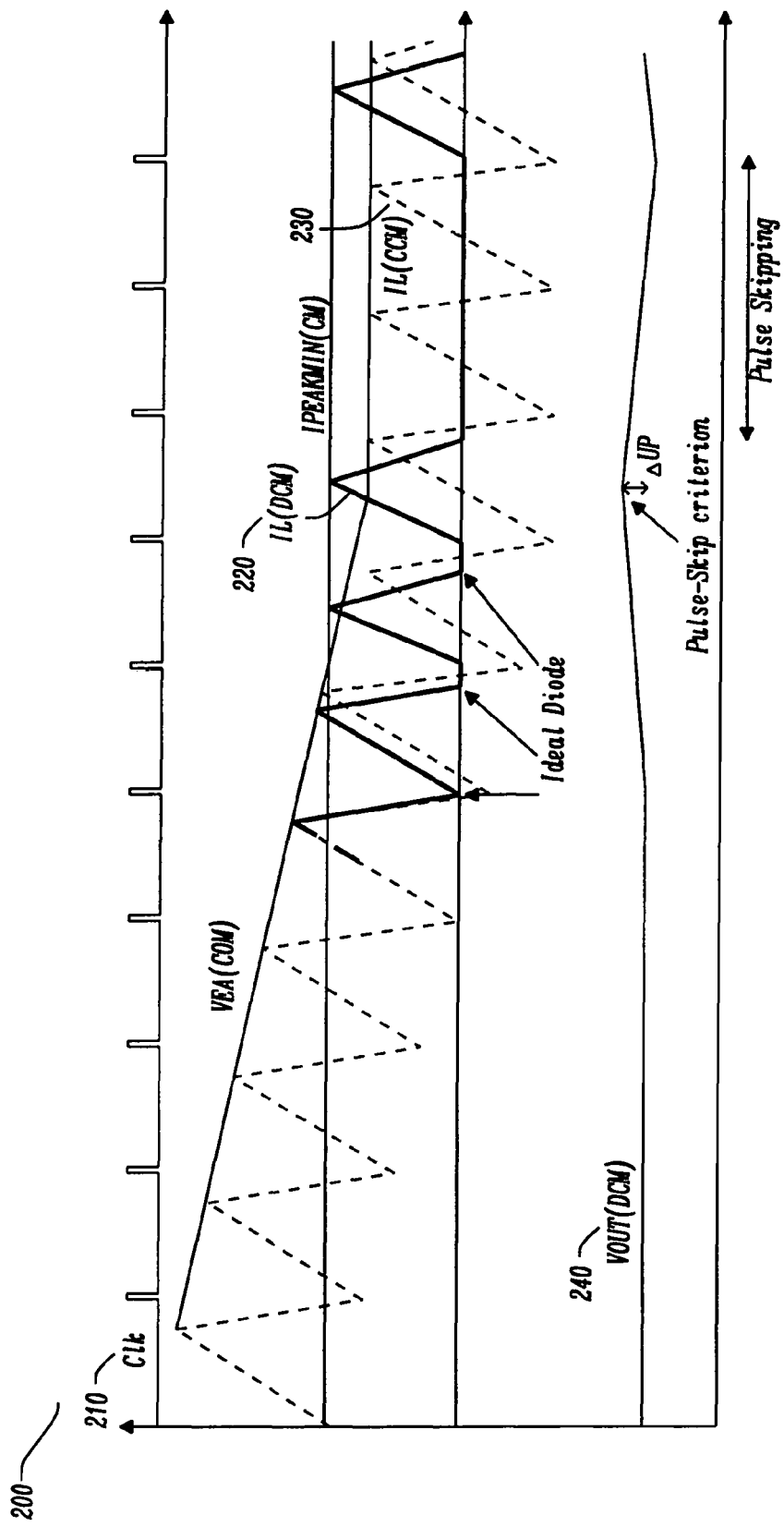
FIG. 2 - Prior Art

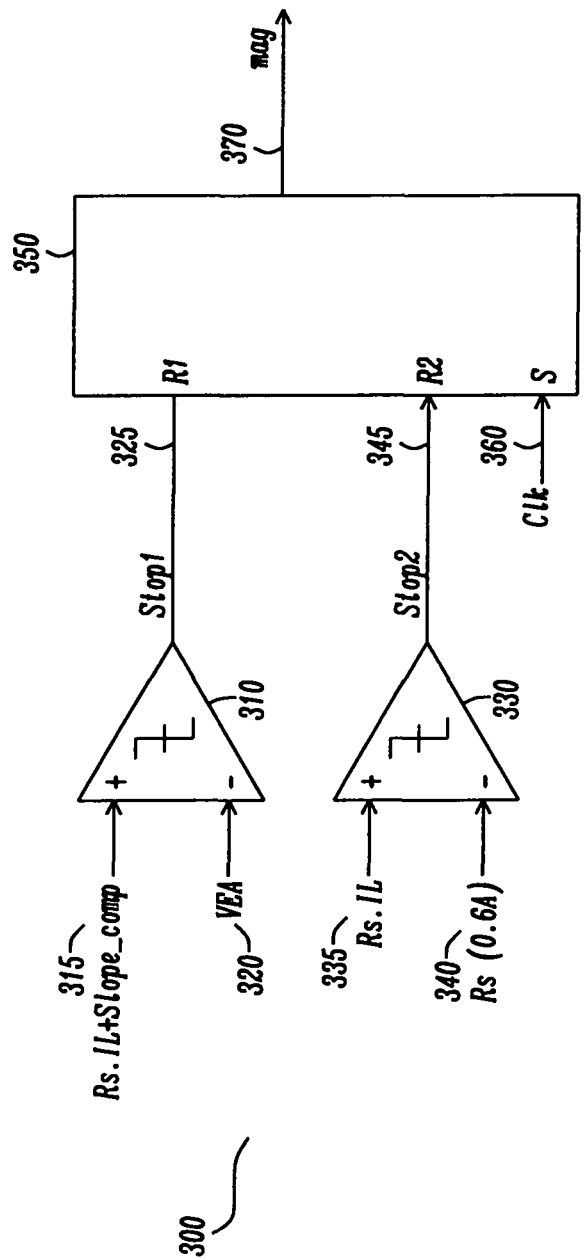
FIG. 3 - Prior Art

//DIGITAL PULSE SKIPPING MODULATION FOR BUCK CONVERTER WITH AUTO-TRANSITION TO PULSE FREQUENCY MODULATION (PFM)

BACKGROUND

Field

The disclosure relates generally to a voltage converter circuit and, more particularly, to a buck converter thereof.

Description of the Related Art

FIG. 1 is a circuit schematic of a buck converter and regulation loop. The buck converter comprises of an input voltage VIN 10, a ground VSS 20, an output voltage VOUT 30, an inductor L 40, a capacitor C 50, a high side switch SH 60, and a low side switch SL 70. The regulation loop comprises of a divider DIV 75, an operational amplifier OA1 80 with input VOUT/K and VREF signals, a current sensor RS 90, a sum function 92 with slope compensation, a comparator 95 with a positive input 94, and negative signal from OA1 80, an RS flip-flop 97 which provides an output signal 100 to the high side switch 60.

When operating at constant frequency, a clock 'clk' is periodically issued and set the magnetization 'mag' signal to '1'. The inductor current IL through inductor L 40 is sensed and converted to a voltage by a multiplication of Rs. Sometimes, a slope-compensation 92 is added, from those skilled in the art are aware of providing. So the comparator CP1 95 emits the signal 'stop' every-time the voltage (Rs.IL+Slope_Comp) 94 exceeds VEA. In other words VEA is the target for the maximum inductor current, also called the peak-current. VEA is regulated by the error amplifier (based on operational amplifier OA1 80 that also acts as the transconductance part of the loop filter) to adjust the required peak inductor current to regulate VOUT 30 to a value proportional to VREF.

As known of those skilled in the art, the ideal case would be to transfer all the input power to the output power. In practice, all the buck converters have losses and do not achieve 100% efficiency. Switching losses are made of the dynamic losses (ohmic losses in the power FETs during the transition in a few ns of the node LX) and of the gate-charge losses (the switch SH 60 is often a MOS transistor whose gate needs to be charged). As order of magnitude, during one period, a total charge of 5 nC to 10 nC is consumed for a 5V-input buck with a MOS that is 20 mΩ resistive. If the switching frequency is 2 MHz, this corresponds to a loss of 50 mW. Therefore, if VOUT is 1.0V and IOUT=50 mA, the output power is similar to the switching losses which makes the efficiency very poor. The standard technique is then to periodically skip the pulses (so to skip the activation of the switch SH) when the output load (so when the output power) is so low that the efficiency of the buck would be impacted by the switching losses. This leads to a disadvantage of a higher ripple on the output voltage node VOUT 30.

FIG. 2 is a timing diagram of pulse skip modulation. In the FIG. 2, a prior art method is illustrated for skipping the pulses. To understand the methodology, assume the output current load decreases. As shown in FIG. 1, the operational amplifier OA1 80 decreases VEA to decrease the peak (and thus average) inductor current IL, thus adapting the inductor current to the output load. The IL-curve (IL(CCM)) 230 of the FIG. 2 describes what would happen is high side switch SH and low side switch SL in the FIG. 1 are straight MOS switches: VEA decreases until IL(CCM) 230 average value is 0 A, corresponding to the OA output load. IL has its reverse current enabled in this case.

To decrease the switching losses, a Discontinuous Modulation (DCM) is illustrated (thick-line IL-curve 220) with two additions:

The first addition is a low-side switch SL is no longer a straight MOS but is implemented as an ideal diode: it has a low resistance when LX is lower than 0V (forward inductor current toward output) and it is OFF when LX is greater than 0V; this prohibits reverse current.

The second addition is the inductor current has a minimum peak value that supersedes the VEA-setting: so even if VEA requires a peak-current lower than the limit IPEAK-MIN, the effective inductor peak-current is clamped down to this minimal value.

As a consequence, when the load current decreases and goes to 0 A (FIG. 2), the condition is as follows:

There is no reverse inductor current due to the ideal diode. So for the same peak-current setting by VEA, the average current in DCM is greater than in CCM. As a result, this leads to the delivery of more current to the output; this results in an increase in the output voltage VOUT and thus leads to the output amplifier OA1 to decrease further value of VEA.

This VEA decreases has no effect below the line in the figure; the inductor peak-current is maintained to the minimum value. As a result, the system delivers more current than needed to the output, and VOUT increases.

Based either on a voltage criterion (in the prior art) or on self-adjusting system (to be discussed), the DCM cycle is held (Pulse Skip Criterion of FIG. 2) until the output voltage VOUT decreases; this then proceeds to the condition, where pulses are restarted.

To achieve the modulation as shown in FIG. 2, the prior art uses various methods, all having in common the use of the ideal diode for the low-side switch. These methods can be defined as two categories:

Parallel loop: In the Parallel Loop method, the inductor current is measured and if low enough, a pseudo-hysteretic method is used to achieve the modulation, as depicted in FIG. 2: it uses a (optional) high-level VOUT-threshold to start skipping the pulses and a low-level VOUT-threshold to re-start the pulses, as well as a dedicated peak-current comparator (to emulate the IPEAKMIN line constant peak current). This requires an extra comparator (voltage threshold) that also needs to be matched to OA1 in terms of accuracy, and also this creates a complicated swap between the hysteretic loop and the peak-current loop. However it has the advantage of deactivating the peak-current loop once the low-current is detected, thus saving consumption.

Main Loop: In the Main Loop methodology the peak-current control loop can be left operating, and another system is used as shown in FIG. 3. FIG. 3 is a prior art Pulse Skip Method. FIG. 3 comprises a first comparator CP1 310, a second comparator CP2 330, and a special latch 350 whose output is mag 370. Comparator CP1 310 has an input Rs.IL+slope compensation 315, and a second input VEA 320. Comparator CP2 330 has an input Rs.IL 335 and second input Rs (0.6 A). In addition to the comparator CP1 310, a second comparator CP2 330 compares the inductor current to a fixed value (e.g. 0.6 A) illustrated in the FIG. 2. A special latch waits until the two reset signals R1 325 and R2 345 go up. So if VEA 320 is very low and limits the peak inductor current to e.g. 0.3 A, the actual peak inductor current will still be 0.6 A, thus achieving the behavior as illustrated in FIG. 2. Yet, a voltage comparator is still needed to stop VOUT from increasing (as observed in FIG. 2), which requires the same matching as in the first method.

Other methods associated with pulse frequency modulation, pulse-skipping modulation and additional methods have been described in the prior art.

U.S. Patent Application 2013/0294118 to So et al., an output estimation for a converter is described. An output current estimation for an isolated flyback converter with variable switching frequency control and duty cycle adjustment for both PWM and PFM modes is discussed. Fly-back converters that may operate over a wide range of power and would benefit from Pulse-Frequency-Modulation (PFM) and Pulse-Skipping-Modulation (PSM) that both vary the frequency while maintaining a relatively constant pulse width or duty cycle is discussed.

U.S. Pat. No. 7,898,235 to Seo, describes a method and apparatus for a voltage conversion, The voltage conversion for pulse width modulation (PWM) and pulse frequency modulation (PFM) is discussed.

U.S. Pat. No. 7,595,596 to Liu describes a power saving control circuit and method for OLED panels. The power stage is controlled by a control circuit. The power stage may be a buck converter, a boost converter, an inverter, or a fly-back voltage supplier. The control circuit may be, e.g., a pulse width modulation circuit, a pulse frequency modulation circuit, a pulse skipping modulation circuit, or a linear regulator.

U.S. Pat. No. 7,592,791 to Emira describes a DC-DC converter and method of improving the efficiency of a DC-DC converter at low load current levels using pulse skipping modulation (PSM) with controllable burst duration U.S. Pat. No. 7,408,333 to Chen et al., describes voltage regulating modes a voltage converter. Three voltage-regulating modes, namely, the pulse-skipping mode, the pulse-width modulation mode and the pulse-frequency modulation mode are integrated, where the optimal conversion efficiency can be achieved in the whole load duration in any case.

In these prior art embodiments, the solution to establish an efficient buck converter utilized various alternative solutions.

SUMMARY

It is desirable to provide a solution using a Main Loop pulse-skipping method with minimal peak current being set in the time domain.

It is desirable to provide a solution using a Main Loop pulse-skipping method with minimal peak current being set in the time domain without the need of a output comparator.

A principal object of the present disclosure is to provide a method that does not require the current detection requirement of a Parallel Loop method.

A principal object of the present disclosure is to provide a method with seam-less transition without a parallel hysteretic loop for activation.

A principal object of the present disclosure is to provide a method with seam-less transition without the problems of loop swapping.

Another further object of the present disclosure is provide a method that is not layout sensitive that utilizes basic analog functional blocks.

Another further object of the present disclosure is to provide a method that does not require a low-threshold comparator.

Another further object of the present disclosure is to provide seamless transition from pulse skipping mode (PSM) to pulse frequency mode (PFM).

Another further object of the present disclosure is to provide easy detection of the load threshold to go to a low power consumption pulse frequency mode (PFM).

As such, a buck converter with an improved transition from pulse frequency modulation (PFM) to pulse skipping modulation (PSM) is disclosed.

In summary, a circuit of a buck converter and regulation loop with pulse skipping modulation (PSM) and auto-transition to pulse frequency modulation (PFM) comprising of a peak current loop is configured to provide a method of generating a constant minimal inductor peak current, and is configured to provide a method of skipping pulses utilizing a pulse skipping modulation (PSM) mode of operation for the the peak current loop, as well as the method of auto-transition from the pulse skipping modulation (PSM) to a pulse frequency modulation (PFM) mode of operation.

In addition, a method is disclosed in accordance with the embodiment of the disclosure. A method of pulse skipping modulation (PSM) and auto-transition to pulse frequency modulation (PFM) comprising of (a) providing a buck converter and regulation loop comprising a peak current loop, (b) generating a constant minimal inductor peak current in said peak current loop, (c) skipping pulses utilizing a pulse skipping modulation (PSM) mode of operation in said peak current loop, and, (d) initiating an auto-transition process from said pulse skipping modulation (PSM) to a pulse frequency modulation (PFM) mode of operation.

Other advantages will be recognized by those of ordinary skill in the art.

BRIEF DESCRIPTION OF THE DRAWINGS

The present disclosure and the corresponding advantages and features provided thereby will be best understood and appreciated upon review of the following detailed description of the disclosure, taken in conjunction with the following drawings, where like numerals represent like elements, in which:

FIG. 1 Prior art is a circuit schematic of a buck converter and regulation loop;

FIG. 2 Prior art is a timing diagram of pulse skip modulation;

FIG. 3 Prior art is a prior art pulse skip method;

DETAILED DESCRIPTION

Figure 4A:
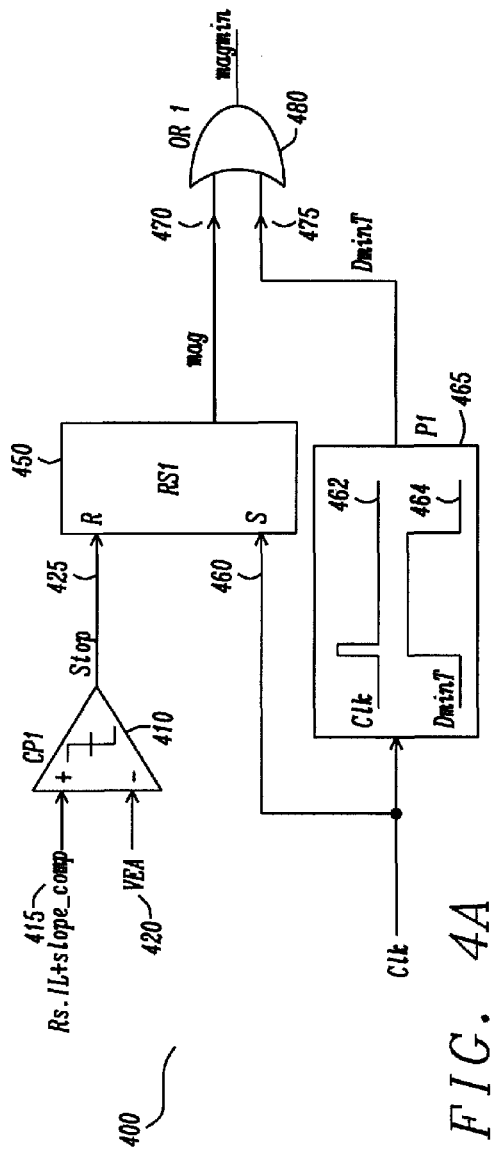
FIG. 4A is a circuit schematic of minimal inductor current generation.

FIG. 4A is a circuit schematic of minimal inductor current generation according to the embodiment in the disclosure.

The first embodiment is made of three parts: the method for generating a constant minimal inductor peak-current, the method for skipping the pulses (PSM: Pulse Skip Modulation) and the method for going to Pulse-Frequency-Modulation (PFM) where, instead of skipping the clock cycles, the buck is self-oscillating. Constant minimal inductor peak current is discussed. In the FIG. 4a, the main principle is highlighted. The circuit schematic 400 comprises of a comparator CP1 410 with first input Rs.IL+slope compensation 415 and a second input VEA 420. The output of the comparator CP1 410 produces a function "stop" 425. The output signal is connected to functional block RS1 450 whose inputs are R 425 and S 460. The output of RS1 produces a signal "mag" 470 providing input to the logic gate OR1 480. The clock Clk 462 is electrically coupled to RS1 450 and P1 465. The output of P1 465 is a function of the signal Clk 462 and DminT 464. The output of this function is signal 475 is coupled to OR1 480. Instead of using the straight 'mag' signal, an extra OR-gate OR1 480 is inserted, and the signal 'magmin' is used instead. Every time a clock occurs, the 'mag' pulse duration is clamped to a minimal duration using the signal DminT 464. For example, in the FIG. 3, the latch RS1 reset its output "mag" only if both Stop1 and Stop2 are '1'. In other words, "mag" is reset only at the latest of Stop1 or Stop2 in the time domain. If VEA is so low, that it would intercept the inductor current IL lower than 0.6 A (set by Stop1), then "mag" is not reset until IL reaches 0.6 A (Stop2). Vice versa: if VEA intercepts IL that is higher than 0.6 A, then Stop1 comes after Stop2, hence Stop2 has no influence. The time-domain magnetization process is such that where IPEAK is indirectly set by a timing, and not by the actual measurement of the inductor current. Note that time domain is possible assuming IL starts being magnetized at a well known value. For this embodiment, the well known value is 0 amperes.

Figure 4B:
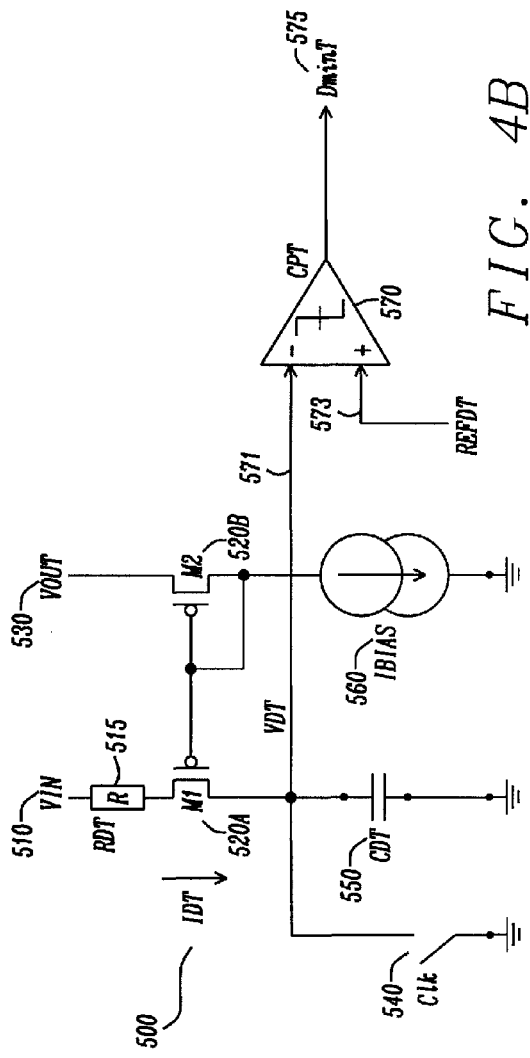
FIG. 4B is a circuit schematic of example of $D_{MIN}$ T generation.

FIG. 4B is a circuit schematic 500 of example of $D_{MIN}T$ generation according to the embodiment in the disclosure. Every time a clock occurs, the 'mag' pulse duration is clamped to a minimal duration using the signal DminT. This duration is sized to achieve a known fixed peak current, as shown by an example in FIG. 4B. FIG. 4B 500 comprises a VIN 510 and VOUT 530 electrically coupled to a p-channel MOSFET current mirror M1 520A, and M2 520B, respectively. The circuit 500 current mirror sources the circuit, comprising a clock resetting switch Clk 540, capacitor CDT 550, and current bias generator IBIAS 560, and a comparator CPT 570. The clock switch 540 and capacitor CDT 550 are coupled to transistor M1 and input 571 to comparator CPT 570. The current bias generator IBIAS 560 is electrically coupled to the current mirror transistor M2 520B. The second input of comparator CPT 570 is REFDT 572. The output of comparator CPT 570 generates the DminT signal 575.

Once the clk has reset the capacitor CDT 550, then the voltage VDT evolves as:

$$VDT(t) = \frac{VIN - VOUT}{RDT \cdot CDT} \cdot t$$

The voltage VDT(t) reaches REFDT and it corresponds to the time $$minT = \frac{RDT \cdot CDT \cdot REFDT}{VIN - VOUT}$$

During this same time, the inductor current is actually charged with the slope (VIN-VOUT)/L. So at the end of the charge, the inductor current has reached the value of $$IPEAK = minT \cdot (VIN - VOUT)/L.$$

When using the value of minT achieved by the circuit of the FIG. 4B, the IPEAK relationship is obtained, as $$IPEAK = \frac{RDT \cdot CDT \cdot REFDT}{L}$$

Assuming RDT 515 and CDT 550 are constant (which is easily achieved by trimming these values and using a temperature-compensated resistance), and assuming the inductor L is constant (L has a reduced de-rating because the critical self-heating and/or saturation current is far to be matched), the system described in the FIG. 4A and FIG. 4B guarantees a minimal IPEAK that can be set by adjusting RDT 515, CDT 550 and REFDT 572, and that does not depend on VIN 510 and VOUT 530.

This method requires to have an inductor current starting from OA (so the ideal diode was used at the previous cycle); this is required to evaluate the peak current that is set by the minimal ON-time. In practice, this is the detection of the ideal diode preventing reverse current at the previous cycle that is used to enable this minimal ON-time setting.

The method is first to determine if there is a need for pulse-skipping. It is based on the detection whether the system used in FIG. 4A is needed or not. Indeed, as soon as this system is needed, then this means that more current than needed is delivered to the output. This method is shown in the FIG. 5A and FIG. 5B.

Figure 5A:
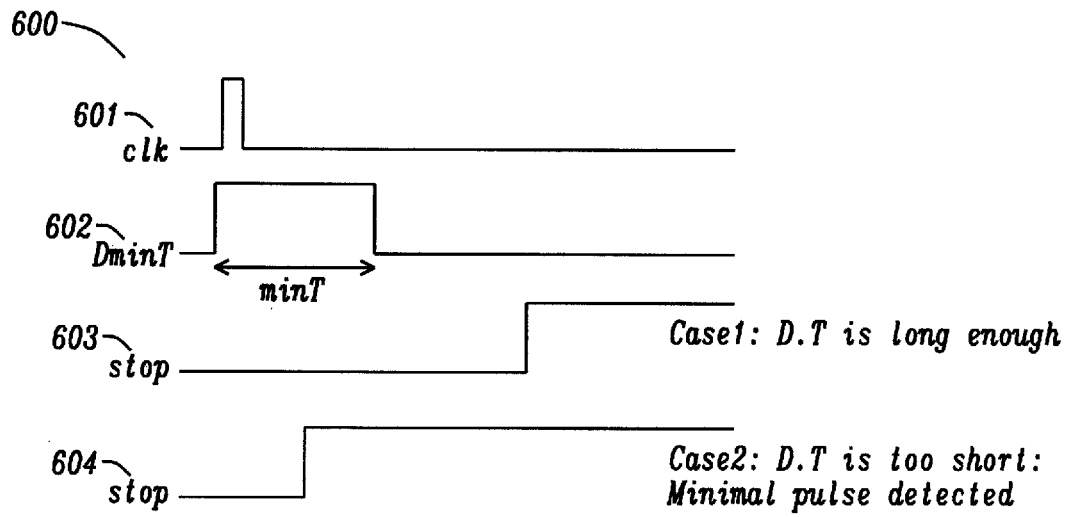
FIG. 5A is a timing diagram of detection of IPEAK minimal value setting.

FIG. 5A is a timing diagram of detection of IPEAK minimal value setting according to the embodiment in the disclosure. Timing diagrams are shown in the plots. The timing diagram 600 contains the signals of clk 601, DminT 602, stop 603 and stop 604.

Figure 5B:
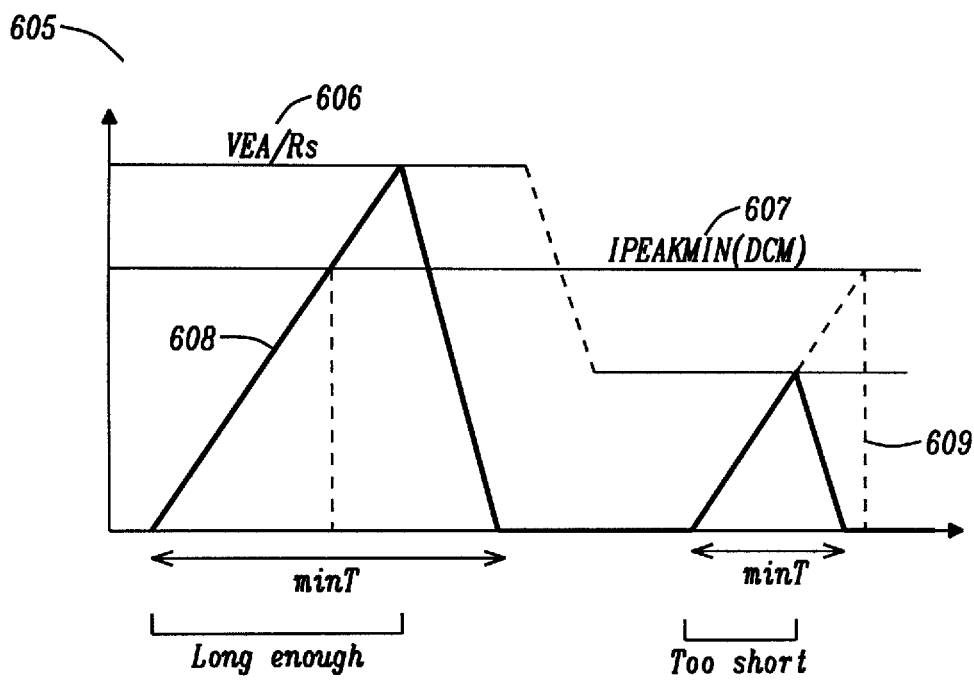
FIG. 5B is a timing diagram of VEA/RS and IPEAK.

FIG. 5B is a timing diagram of VEA/RS and IPEAK. In the plot 605 the timing signals are shown for VEA/RS 606, IPEAK 607, and signals 608, and 609. The plot of 610 shows signals clk 611, DminT 612, stop 613, and stop 614. In the plot 615, the signals are VEA/RS 616, IPEAK 617, and signals 618, and signals 619.

When the duration minT has elapsed, the corresponding falling edge of the signal 'DminT' is used to sample the comparator 'stop' signal.

Case 1: If the 'stop' signal is sampled low, this means the comparator (thus VEA) is trying to set a peak current value greater than the (e.g. 0.6 A) minimal value. In this case the MVSS is not active; no pulse skipping is required.

Case 2: If the 'stop' signal is sampled high, this means the comparator already attempted to stop the inductor current from increasing. So this means the IPEAK Minimal Value Setting System (MVSS) is active. As illustrated in FIG. 2, IPEAK is clamped to a minimum value. This results in injection of too much inductor current to the output, and some pulse skipping is needed to lower the average value of the inductor current.

Figure 6:
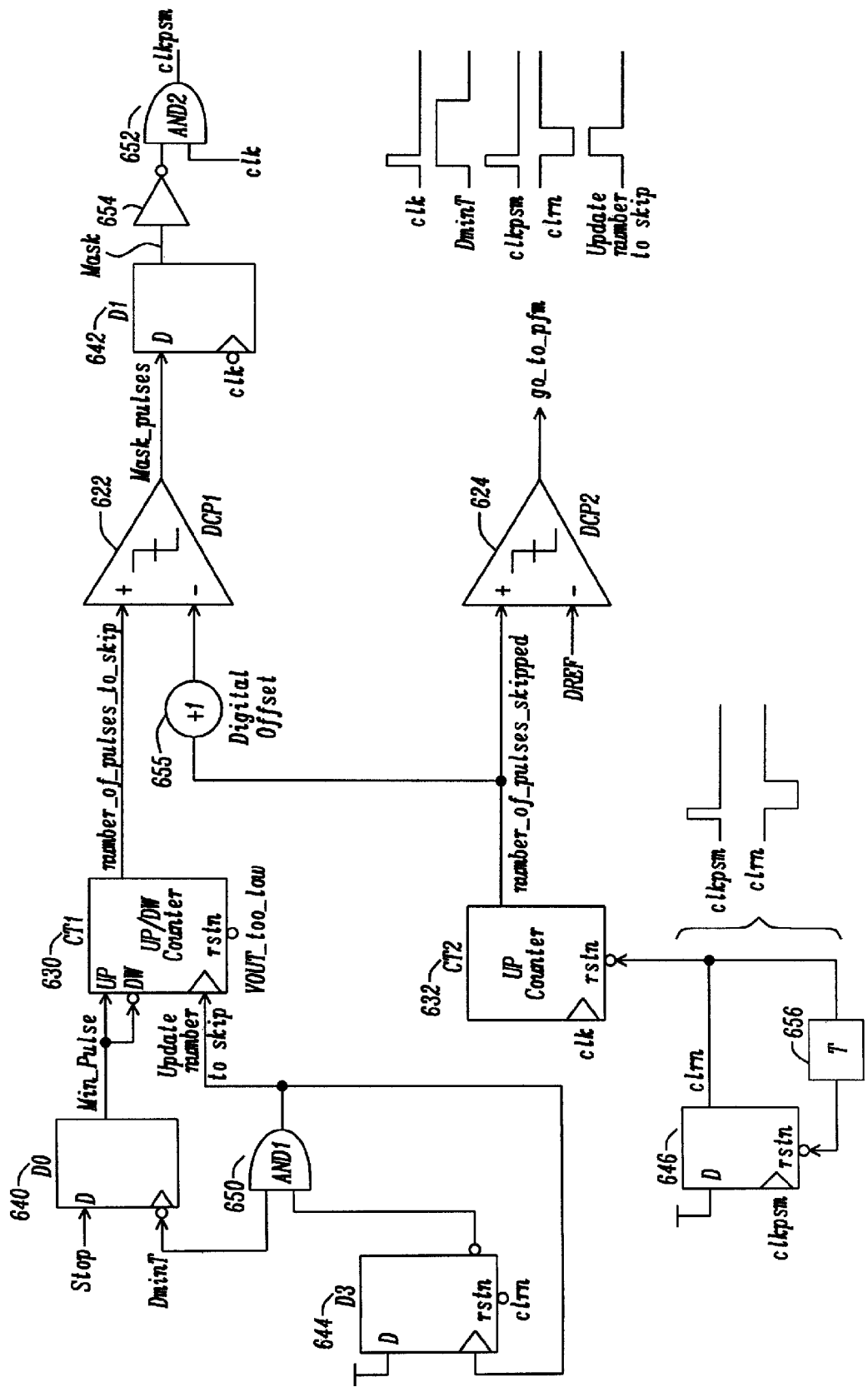
FIG. 6 is a circuit schematic of pulse skipping method.

Second, we can now choose to skip some pulses depending on the MVSS detection (e.g. if the inductor current is clamped to a minimum value): the corresponding digital system is displayed in the FIG. 6. This is no longer the constant frequency 'clk' signal that is used eventually to generate the 'mag' signal. Instead, this is 'clkpsm', that is a version of 'clk' being periodically masked.

FIG. 6 is a circuit schematic of pulse skipping method according to the embodiment in the disclosure. The circuit 620 comprises a D flip-flop 640, coupled to a counter CT1 630. A D3 flip-flop 644 followed by an AND function AND1 650 is electrically coupled to counter CT1 630. In parallel there is a counter CT2 632 is electrically coupled to a D flip-flop 646 and T (delay) function 656. The counter CT2 632 was electrically coupled to a comparator DCP1 622 and comparator DCP2 624. A function 655 establishes a digital offset. The comparator DCP1 622 output are coupled to the D flip-flop D1 642. The D flip-flop 642 is connected to the inverter 654, followed by an AND function AND2 652.

The D flip-flop D0 640 is used to detect the MVSS (inductor peak current clamping) being active or not as described previously. This is stored as a flag Min_Pulse, applied onto the UP-input of an UP/DW counter CT1 630. When DminT expires, CT1 630 increments/decrements its digital output depending on the detection issued by MVSS. If the system is clipping the inductor peak-current to more than what VEA is setting, the pulses need to be skipped. This operation is clocked by the second UP-counter CT2: CT2 632 counts the 'elk' signal occurrences. As long as this counts does not reach the target set by CT1 630, then the clock 'clk' is masked at the output because the digital comparator DCP1 622 output is '1'. Once the CT2 632 output (which is a digital saw-tooth) reaches the CT1 630 output, then the system authorizes the 'clk' to go through, and in the same time does two updates:
1. It reset the counter CT2 632, so that a new saw-tooth can be initiated
2. It generates a clock pulse to update CT1 630. If CT1 630 still sees that the inductor current is greater than what VEA set, more pulses need to be skipped and CT1 630-output is incremented. Vice versa, if VEA requires more current than the (e.g. 0.6 A) minimal setting, this means more pulses need to be generated and CT1 630-output is decremented.

Note that CT1 630 can be reset in case of very sudden transient loads pulling down VOUT, but the corresponding comparator costs nothing because it is achieved using the operational amplifier OA1 (from FIG. 1) from which one branch can be used in comparator mode.

At last, a second digital comparator DCP2 624 is used to compare the number of pulses that are skipped to a predefined number DREF. DREF represents the threshold (number of skipped pulses) at which the current delivered to the output get below an intended threshold current, say 200 mA. A quick calculation gives:

$$DREF = NSKIP_{threshold} = \frac{L \cdot (0.6A)^2}{2 \cdot T_{clk} \cdot I_{thres}} \cdot \frac{VIN}{VOUT \cdot (VIN - VOUT)}$$

Where Ithres=200 mA is given as example such that when the load (and the inductor current) is below this threshold, then it is preferable to leave the PSM and go to a self-oscillating PFM. The reason to go to PFM is to deactivate more functions (oscillator and circuitry to drive the node VEA) to save further consumption drawn from the supply and increase further the frequency (parallel loop method mentioned earlier).

While a straight transition PSM to PFM seems the easiest way, this comparator DCP2 allows to adjust to a further lower value the inductor current threshold to enter PFM. This allows to introduce an hysteresis for the current threshold to enter and leave PFM, and also allows to choose a lower threshold value for entering the PFM at will.

Figure 7:
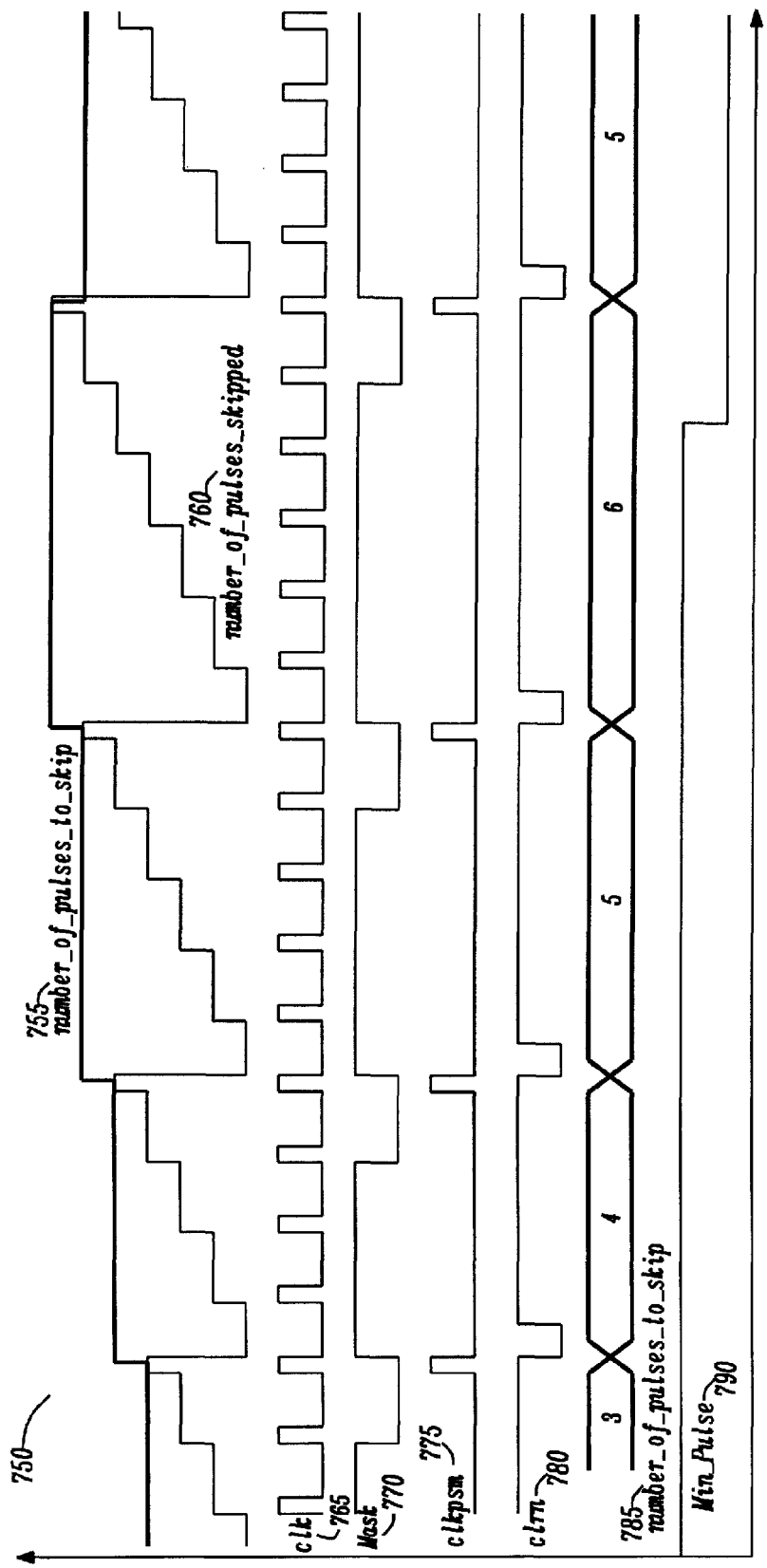
FIG. 7 is a timing diagram of pulse skipping reach self-toggling.

FIG. 7 is a timing diagram of pulse skipping reach self-toggling. FIGS. 700 and 750 highlight the timing diagram of pulse skipping. The timing diagram 700 consists of the timing diagram of number of pulses to skip 705, number of pulses skipped 710, clk 715, Mask 720, clk psm 725, elm 730, number of pulses to skip 735, and Min_Pulse 740.

More and more 'clkpsm' pulses are skipped as long as it is required (e.g., so as long as the MVSS, that clamps the inductor peak current to a minimum value, set Min_pulse to '1'). There is a point at which the pulses are so scattered that hardly any current is delivered to the output, and VOUT starts to decrease, thus increasing VEA and requiring more peak current. Eventually, the number of skipped pulses will toggle between two values to regulate the peak current to the value set in the FIG. 4A and FIG. 4B. Once the digital comparator DCP2 has issued its signal to go to PFM, the PFM loop is activated.

Figure 8:
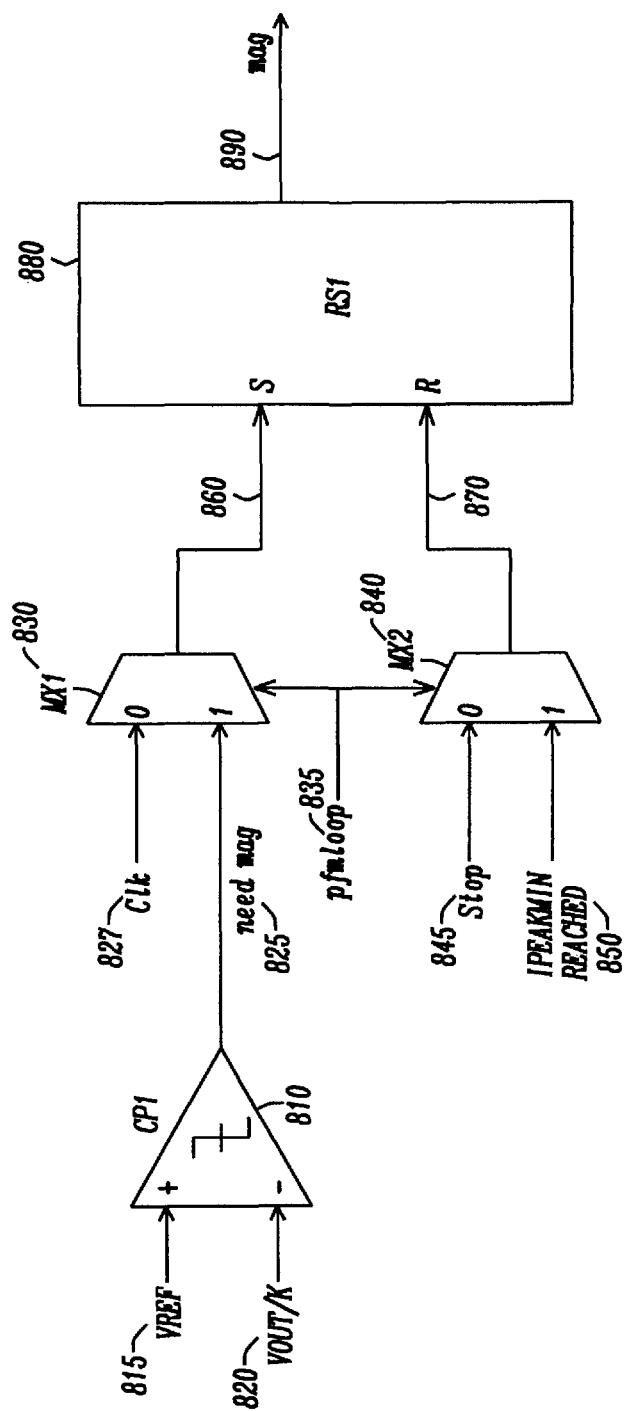
FIG. 8 is a circuit schematic of PFM loop in accordance with the embodiment of the disclosure.

FIG. 8 is a circuit schematic of PFM loop in accordance with the embodiment of the disclosure. As discussed in the last section, once the digital comparator DCP2 has issued its signal to go to PFM, the PFM loop is activated. In the circuit schematic 800, the circuit comprises of a comparator CP1 810, a first multiplexer (MUX) MX1 830, a second multiplexer (MUX) MX2 840, and logic function 880 which generates the "mag" signal 890. The digital multiplexers MX1 830 and MX2 840 select in PFM their '1'-inputs. Every time VOUT falls lower than k.VREF, a 'mag' pulse is initiated, its duration is set by the same IPEAKMIN circuit 850 described in FIG. 4A and FIG. 4B so not only this same circuit (FIG. 4B) can be reused, but it also ensure that when swapping from PSM to PFM, the peak current does not change.

Figure 9:
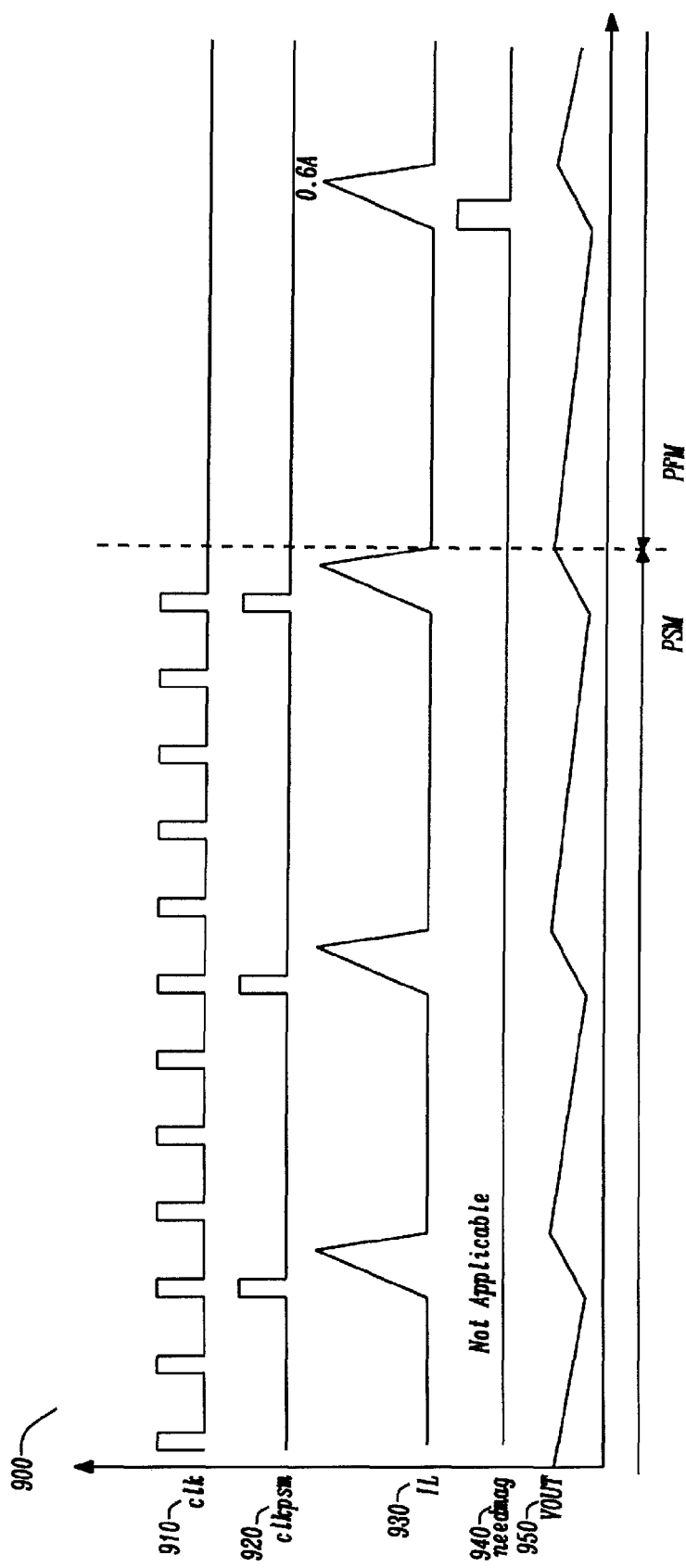
FIG. 9 is a timing diagram of transition from PSM to PFM.

FIG. 9 is a timing diagram of transition from PSM to PFM. The figure shows the timing diagram 900 for the signals clk 910, clkpsm 920, IL 930, need mag 940, and VOUT 950.

Once a threshold number of skip pulses is counted, the controller goes to PFM: most of the circuitry (including the clocks) is deactivated, and only the circuit of the FIG. 8 (and FIG. 4A and FIG. 4B)) is used to save current. Thanks to this common use of the circuitry in FIG. 4A and FIG. 4B there was no difference at the transition for the inductor current.

Figure 10:
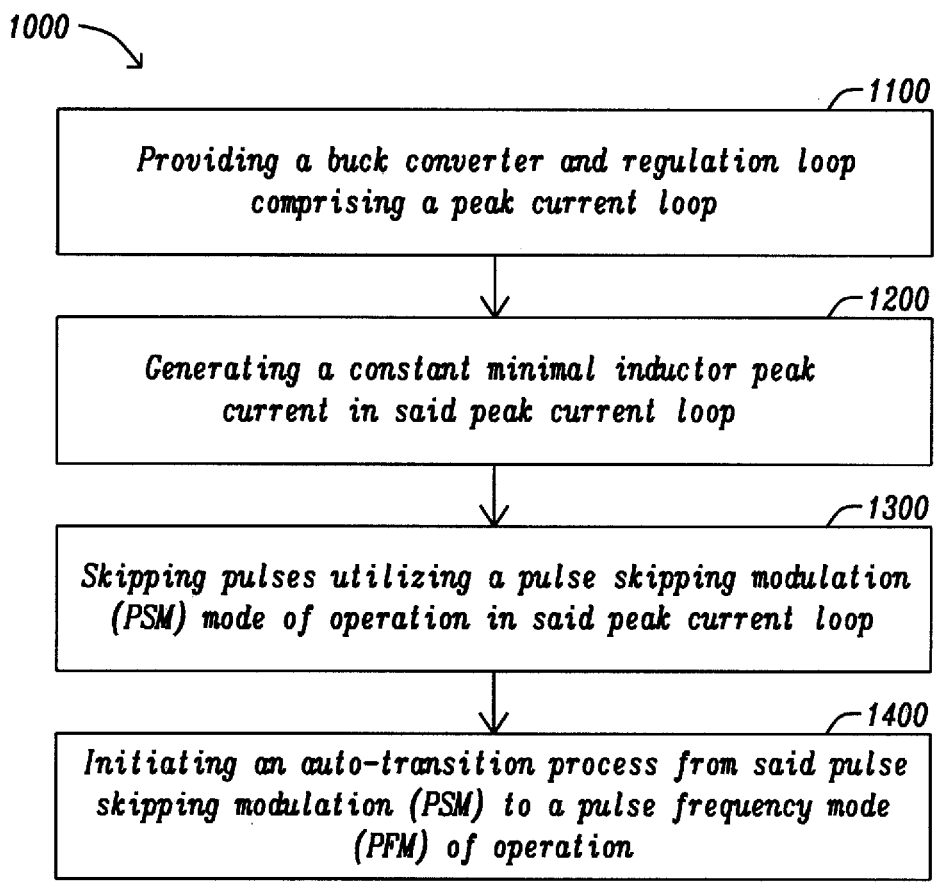
FIG. 10 is method in accordance with the embodiment of the disclosure.

FIG. 10 is method in accordance with the embodiment of the disclosure. A method 1000 of pulse skipping modulation (PSM) and auto-transition to pulse frequency modulation (PFM) comprising of a first step 1100 providing a buck converter and regulation loop comprising a peak current loop and a hysteretic loop, a second step 1200 generating a constant minimal inductor peak current in said peak current loop, a third step 1300 skipping pulses utilizing a pulse skipping modulation (PSM) mode of operation in said peak current loop, and lastly, fourth step 1400 initiating an auto-transition process from said pulse skipping modulation (PSM) to a pulse frequency modulation (PFM) mode of operation.

It should be noted that the description and drawings merely illustrate the principles of the proposed methods and systems. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the proposed methods and systems and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Other advantages will be recognized by those of ordinary skill in the art. The above detailed description of the disclosure, and the examples described therein, has been presented for the purposes of illustration and description. While the principles of the disclosure have been described above in connection with a specific device, it is to be clearly understood that this description is made only by way of example and not as a limitation on the scope of the disclosure.

What is claimed is:

1. A buck converter and regulation loop with pulse skipping modulation (PSM) and direct auto-transition to pulse frequency modulation (PFM) where in PFM the buck converter is self oscillating wherein the oscillating frequency of the PFM pulses depends on the inductor current, while in PSM clock cycles are skipped comprising:
   a peak current loop configured to provide a method of generating a constant minimal inductor peak current being set in a time domain by a circuitry configured to set a constant minimal inductor peak current, wherein said circuitry is configured to determine a minimum duration of a pulse which determines the minimal inductor peak current;
   said peak current loop configured to enable a method of skipping pulses utilizing a pulse skipping modulation (PSM) mode of operation, wherein clock pulses are masked to enable the pulse skipping; and
   said peak current loop configured to enable a method of a seamless direct auto-transition from said pulse skipping modulation (PSM) to a pulse frequency modulation (PFM) mode of operation, wherein the direct auto-transition from PSM to PFM is performed once a threshold number of skip pulses is counted and wherein a lower value of an inductor current threshold is used to enter PFM mode of operation again.

2. The buck converter and regulation loop of claim 1, wherein said peak current loop comprises a method of pulse skipping modulation (PSM) comprises digital circuits.

3. The buck converter and regulation loop of claim 1, wherein said peak current loop comprises a method of pulse skipping modulation (PSM) comprises analog circuits.

4. The buck converter and regulation loop of claim 1, wherein said peak current loop is configured to provide a method for clipping a minimal duration of a magnetization signal (mag) to guarantee an intended minimal inductor current.

5. The buck converter and regulation loop of claim 4, wherein said peak current loop comprises a digital system configured to provide detection of said clipping.

6. The buck converter and regulation loop of claim 5, wherein said digital system is an inductor peak current clipping system, which is only active when pulse skipping is required.

7. The buck converter and regulation loop of claim 6, wherein said inductor peak current clipping system comprises a periodic update of a number of clock pulses to skip.

8. The buck converter and regulation loop of claim 7, wherein said inductor peak current clipping system updating the number of clock pulses to skip is configured to provide a comparison of a clocked digital saw-tooth signal to a target.

9. The buck converter and regulation loop of claim 1, wherein said peak current loop is configured to provide a digital-based transition method of seamless direct auto-transition from said pulse skipping modulation (PSM) to a pulse frequency modulation (PFM) mode of operation configured to provide a trigger for direct transition by setting a number of skipped pulses.

10. The buck converter and regulation loop of claim 1, wherein a peak inductor current from pulse skipping method (PSM) to pulse frequency modulation (PFM) is constant and reused for the peak-current generator in PFM mode of operation.

11. The buck converter and regulation loop of claim 1, wherein the buck converter and regulation loop is configured to provide a method of self-calibration in pulse skipping mode (PSM) utilizing an inductor current zero-crossing comparator.

12. The buck converter and regulation loop of claim 11, wherein in the pulse skipping mode (PSM) method a PSM to PFM transition calibrated value is a constant.

13. The buck converter and regulation loop of claim 1, wherein a hysteresis for a current threshold to enter and leave PFM is used.

14. The buck converter and regulation loop of claim 1, wherein said duration of the minimum pulse which determines the minimal inductor peak current can be set by adjusting components of the circuitry configured to set a constant minimal inductor peak current without depending on an input or an output voltage of the buck converter.

15. A method of pulse skipping modulation (PSM) and direct auto-transition to pulse frequency modulation (PFM) comprising the steps of:
   providing a buck converter and regulation loop comprising a peak current loop;
   generating a constant minimal inductor peak current in said peak current loop, wherein the constant minimal inductor peak current is being set in a time domain by a circuitry configured to set a constant minimal inductor peak current, wherein said circuitry is configured to determine a minimum duration of a pulse which determines the minimal inductor peak current;
   skipping pulses utilizing a pulse skipping modulation (PSM) mode of operation in said peak current loop; and
   initiating a seamless direct auto-transition process from said pulse skipping modulation (PSM) to a pulse frequency modulation (PFM) mode of operation, wherein the direct auto-transition from PSM to PFM is performed once a threshold number of skip pulses is counted and wherein a lower value of an inductor current threshold is used to enter PFM mode of operation again.

16. The method of claim 15, wherein said peak current loop comprises a method of pulse skipping modulation (PSM) comprising digital circuits.

17. The method of claim 15, wherein said peak current loop comprises a method of pulse skipping modulation (PSM) comprising circuits.

18. The method of claim 15, wherein said peak current loop provides a method for clipping a minimal duration of a magnetization signal (mag) to guarantee an intended minimal inductor current.

19. The method of claim 18, wherein said peak current loop comprises a digital system provides detection of the said clipping.

20. The method of claim 19, wherein said digital system is an inductor peak current clipping system, which is only active when pulse skipping is required.

21. The method of claim 20, wherein said inductor peak current clipping system comprises a periodic update of a number of clock pulses to skip.

22. The method of claim 21, wherein said inductor peak current clipping system of the number of clock pulses to skip provides a comparison of a clocked digital saw-tooth signal to a target.

23. The method of claim 15, wherein said peak current loop provides a method of seamless direct auto-transition from said pulse skipping modulation (PSM) to a pulse frequency modulation (PFM) mode of operation, wherein a digital-based direct transition from PSM to PFM provides a trigger for transition by setting a number of skipped pulses.

24. The method of claim 15, wherein a peak inductor current from pulse skipping method (PSM) to pulse frequency modulation (PFM) is constant and reused for a peak-current generator in PFM mode of operation.

25. The method of claim 15 provides a method of self-calibration in pulse skipping mode (PSM) utilizing an inductor current zero-crossing comparator.

26. The method of claim 15, wherein in said seamless direct auto-transition process from the pulse skipping modulation (PSM) mode of operation a PSM to PFM transition calibrated value is a constant.

27. The method of claim 15 wherein a hysteresis for a current threshold to enter and leave PFM is used.

28. The method of claim 15, wherein said duration of the minimum pulse which determines the minimal inductor peak current can be set by adjusting components of the circuitry configured to set a constant minimal inductor peak current without depending on an input or an output voltage of the buck converter.

\* \* \* \* \*